(12) United States Patent
Lee

(10) Patent No.: US 8,866,967 B2
(45) Date of Patent: Oct. 21, 2014

(54) METHOD AND APPARATUS FOR MOTION ADAPTIVE DEINTERLACING

(75) Inventor: Jong-whan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1744 days.

(21) Appl. No.: 11/862,379

(22) Filed: Sep. 27, 2007

(65) Prior Publication Data

US 2008/0100744 A1 May 1, 2008

(30) Foreign Application Priority Data

Oct. 25, 2006 (KR) .................. 10-2006-0103894

(51) Int. Cl.
*H04N 7/01* (2006.01)
*H04N 5/14* (2006.01)

(52) U.S. Cl.
CPC .............. *H04N 5/144* (2013.01); *H04N 7/0137* (2013.01); *H04N 7/012* (2013.01)
USPC ......................................... 348/452; 348/448

(58) Field of Classification Search
USPC ................................................. 348/441–459
See application file for complete search history.

(56) References Cited

U.S. PATENT DOCUMENTS

| 5,936,676 A * | 8/1999 | Ledinh et al. ................. 348/452 |
| 7,502,071 B2 * | 3/2009 | Matsuzaki et al. ............ 348/452 |
| 7,787,048 B1 * | 8/2010 | Vojkovich et al. ............ 348/452 |
| 2002/0080284 A1 * | 6/2002 | Kim et al. ..................... 348/700 |
| 2004/0125231 A1 | 7/2004 | Song et al. |
| 2006/0033839 A1 * | 2/2006 | Chao ............................. 348/448 |
| 2006/0109377 A1 * | 5/2006 | Chao ............................. 348/448 |

FOREIGN PATENT DOCUMENTS

| JP | 2000-287182 A | 10/2000 |
| KR | 10-2000-0046212 A | 7/2000 |
| KR | 2003-0037345 A | 5/2003 |
| KR | 10-2003-0049140 A | 6/2003 |
| KR | 10-2004-0048478 A | 6/2004 |
| KR | 10-2004-0061244 A | 7/2004 |
| KR | 10-2004-0099560 A | 12/2004 |
| KR | 10-2005-0107060 A | 11/2005 |
| KR | 10-2005-0108236 A | 11/2005 |
| KR | 10-2005-0115559 A | 12/2005 |

OTHER PUBLICATIONS

Communication dated Jan. 8, 2008 by the Korean Intellectual Property Office in counterpart Korean Application No. 10-2006-0103894.

* cited by examiner

*Primary Examiner* — Michael Lee

(74) *Attorney, Agent, or Firm* — Sughrue Mion, PLLC

(57) ABSTRACT

A deinterlacing method and apparatus for converting an interlaced format into a progressive format are provided. The deinterlacing method includes receiving a plurality of interlaced video fields; extracting a previous video field having a same field identifier as a currently input video field from the interlaced video fields; detecting motion by comparing the extracted previous video field with the currently input video field; and interpolating the currently input video field according to a result of detecting the motion. The apparatus includes an input unit; a first field memory; a second field memory; a motion detection unit which detects motion by comparing a previous video field stored in the first field memory with the currently input video field; and a temporal interpolation unit which, if motion is detected, performs temporal interpolation with respect to the currently input video field using only the previous video field stored in the second field memory.

17 Claims, 3 Drawing Sheets

METHOD AND APPARATUS FOR MOTION ADAPTIVE DEINTERLACING

CROSS-REFERENCE TO RELATED PATENT APPLICATION

This application claims priority from Korean Patent Application No. 10-2006-0103894, filed on Oct. 25, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to converting an interlaced format into a progressive format, and more particularly, to motion adaptive deinterlacing, which performs deinterlacing directly on a current video field to which temporal interpolation is applied, without using signal information of a next video field after the current video field.

2. Description of the Related Art

In general, a video signal for an image is implemented in either an interlaced format or a progressive format. A video signal in the interlaced format includes a plurality of fields. In contrast, a video signal in the progressive format includes a plurality of frames. A complete frame of the video using an interlacing format is generated by interlacing lines of an odd field between lines of an even field.

A television (TV) video signal uses interlaced scanning for compressing a transmission frequency band. Since personal computers (PCs) or high-definition (HD) TVs use progressive scanning, to display a TV video signal, the PCs or HDTVs must generate additional video lines that are not included in an interlaced scanned video signal. In other words, a reproduction apparatus capable of processing a progressive video signal has to first convert the interlaced video signal into a progressive video signal. This conversion is referred to as deinterlacing or interlaced-to-progressive conversion (IPC).

FIG. 1 is a view for explaining a concept of general deinterlacing of video data.

Referring to FIG. 1, deinterlacing changes a field 110 including either horizontal even-numbered sample lines or horizontal odd-numbered sample lines into a frame 120. An output frame ($F_0(\vec{x},n)$) is defined as follows:

$$F_0(\vec{x}, n) = \begin{cases} F(\vec{x}, n), & (y \bmod 2 = n \bmod 2), \\ F_i(\vec{x}, n), & \text{otherwise,} \end{cases} \quad (1)$$

where $\vec{x}$ denotes a spatial position, n denotes a field number, $F(\vec{x},n)$ denotes an input field, and $F_i(\vec{x},n)$ denotes a pixel to be interpolated.

As can be seen from FIG. 1, a resolution of the interlaced video signal is halved in comparison to the progressive scan video signal. In a case of a 480/60i resolution of the National Television Standard Committee (NTSC) standard, a single frame is divided into two 240-line fields and the 240-line fields are displayed one after the other every 1/60 seconds. This interlacing allows video data to be transmitted to a low-performance cathode ray tube (CRT) using a small amount of data, but a disadvantage occurs in that a fast scene or a complex image cannot be presented in detail.

FIG. 2 is a view for explaining temporal interpolation with respect to a current video field according to a related art deinterlacing method.

Referring to FIG. 2, when a current input field is an $n^{th}$ video field 220, for interpolation with respect to a line of the $n^{th}$ video field 220, pixel data information of a line of a previous field, i.e. an $(n-1)^{th}$ video field 210, which corresponds to the line of the $n^{th}$ video field 220, and pixel data information of a line of the next field, i.e. an $(n+1)^{th}$ video field 230, which corresponds to the line of the $n^{th}$ video field 220, are referred to. In other words, when the $n^{th}$ video field 220 is an even field and a bottom field, the $n^{th}$ video field 220 has video information of only even lines. Information for an empty line portion 221 is interlaced by referring to a portion 211 corresponding to the empty line 221 in the $(n-1)^{th}$ video field 210 that is an odd field and a top field, and temporally precedes the $n^{th}$ video field 220, and a portion 231 corresponding to the empty line 221 in the $(n+1)^{th}$ video field 230 that is an odd field and a top field, and temporally follows the $n^{th}$ video field 220.

FIG. 3 is a functional block diagram of an apparatus for motion adaptive deinterlacing in a related art deinterlacing apparatus.

Referring to FIG. 3, the related art deinterlacing apparatus includes a first field memory 320 and a second field memory 310 for storing, managing, and delaying an interlaced video signal input from an input unit 305, a motion detection unit 330 for determining whether or not a pixel as well as an object between fields has motion, a spatial interpolation unit 340 for performing spatial interpolation as an interpolation unit for interpolation with respect to each field, a temporal interpolation unit 350 for temporal interpolation, and an adaptive mixer 360 for performing spatial interpolation, temporal interpolation, or a combination thereof according to the determined motion.

An interlaced video signal is input to the input unit 305, and the first field memory 320 stores a previous $(n-1)^{th}$ video field. The second field memory 310 stores the current $n^{th}$ video field and performs interpolation with respect to that video field. Since it should be first determined that a line portion to be interpolated has no motion to perform temporal interpolation, input of a next $(n+1)^{th}$ video field, i.e., a video field after the current $n^{th}$ video field, is waited for. Once the $(n+1)^{th}$ video field is received, the $(n+1)^{th}$ video field is compared with the $(n-1)^{th}$ video field stored in the first field memory 320. If it is determined that the line portion to be interpolated has no motion since the difference between data values of the previous $(n-1)^{th}$ video field and the next $(n+1)^{th}$ video field is small, the temporal interpolation unit 350 receives the previous $(n-1)^{th}$ video field and the next $(n+1)^{th}$ video field and performs interpolation with respect to the previous $(n-1)^{th}$ video field and the next $(n+1)^{th}$ video field by referring to data of the line portion to be interpolated in the current nth video field (as illustrated by the dotted line which inputs into the temporal interpolation unit 350).

On the other hand, if it is determined that the line portion to be interpolated has motion since the difference between the previous $(n-1)^{th}$ video field and the next $(n+1)^{th}$ video field is large, lines above and below the current $n^{th}$ video field may have low correlation with each other. In this case, the spatial interpolation unit 340 performs intra field interpolation such as slope correlation interpolation using the current $n^{th}$ video field.

However, during the related art interlacing process described above, the signal of the next field following the current field is required for interpolation. Subsequently, a temporal field delay occurs between the input and the output, resulting in a video delay which is noticeable by a user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a deinterlacing method, in which interpolation is performed by detecting motion in a current field without using information of the next field following the current field, while deinterlacing an interlaced video signal.

The present invention also provides a deinterlacing method, in which temporal interpolation is performed using only the previous field preceding the current field without the input of the next field following the current field, while deinterlacing an interlaced video signal.

The present invention also provides a deinterlacing method and apparatus and a reproduction apparatus therefor, which performs interpolation by detecting motion in a current field without using information of the next field following the current field, and performs temporal interpolation using only the previous field preceding the current field without waiting for the next field following the current field, while deinterlacing an interlaced video signal.

According to an aspect of the present invention, there is provided a deinterlacing method for converting an interlaced format into a progressive format. The deinterlacing method includes receiving a plurality of interlaced video fields, extracting a previous video field having a same field identifier (ID) as a field ID of a currently input video field from the plurality of interlaced video fields, detecting motion by comparing the previous video field which is extracted with the currently input video field, and interpolating the currently input video field according to a result of the detecting the motion.

The detecting the motion may include comparing a difference between the extracted previous video field and the currently input video field with a threshold value.

According to another aspect of the present invention, there is provided a deinterlacing method for converting an interlaced format into a progressive format. The deinterlacing method includes receiving a plurality of interlaced video fields, extracting a previous video field having a different field ID from a field ID of a currently input video field from the plurality of interlaced video fields, and performing temporal interpolation with respect to the currently input video field using only the extracted previous video field.

The temporal interpolation may include detecting an error in the temporal interpolation by comparing information of the currently input video field with information of the previous video field.

According to another aspect of the present invention, there is provided a deinterlacing method for converting an interlaced format into a progressive format. The deinterlacing method includes receiving a plurality of interlaced video fields, extracting a previous video field having a same field ID as a field ID of a currently input video field from the plurality of interlaced video fields, detecting motion by comparing the extracted previous video field with the currently input video field; and if motion is detected, extracting a previous video field having a different field ID from the field ID of the currently input video field from the plurality of interlaced video fields; and performing temporal interpolation with respect to the currently input video field using only the extracted previous video field having the different field ID from the field ID of the currently input video field.

The detecting the motion may include comparing a difference between the extracted previous video field and the currently input video field with a threshold value.

The performing of the temporal interpolation may include detecting an error in the temporal interpolation by comparing information of the currently input video field with information of the previous video field.

The detecting the motion may include storing a result of the motion detection as a history.

According to another aspect of the present invention, there is provided a deinterlacing apparatus for converting an interlaced format into a progressive format. The deinterlacing apparatus includes an input unit which inputs a plurality of interlaced video fields, a first field memory which stores a previous video field having a same field ID as a field ID of a currently input video field among the plurality of interlaced video fields, a second field memory which stores a previous video field having a different field ID from the field ID of the currently input video field among the plurality of interlaced video fields, a motion detection unit which detects motion by comparing the previous video field which is stored in the first field memory with the currently input video field, and a temporal interpolation unit which, if motion is detected by the motion detection unit, performs temporal interpolation with respect to the currently input video field using only the previous video field which is stored in the second field memory.

The temporal interpolation unit may detect an error by comparing information of the currently input video field with information of the previous video field which is stored in the second field memory.

The deinterlacing apparatus may further include a history unit which stores and manages a result of the motion detection with respect to at least one previous video field.

The deinterlacing apparatus may further include a spatial interpolation unit which performs spatial interpolation with respect to the currently input video field, and an adaptive mixer which selectively mixes an output of the spatial interpolation unit and an output of the temporal interpolation unit according an output of the motion detection unit during interpolation with respect to the currently input video field.

According to another aspect of the present invention, there is provided a computer-readable recording medium having recorded thereon a program for implementing the deinterlacing method.

According to another aspect of the present invention, there is provided a video reproduction apparatus comprising the deinterlacing apparatus.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described in detail with reference to the accompanying drawings.

Figure 1:
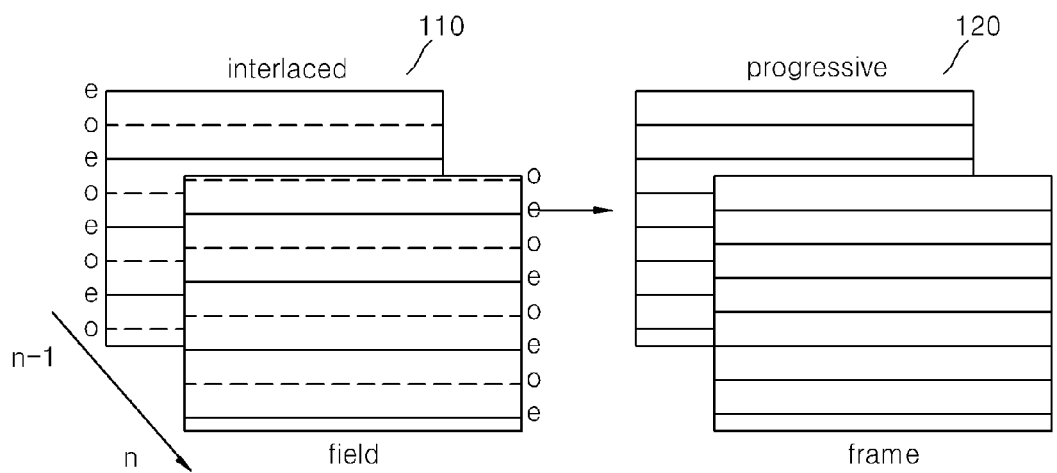
FIG. 1 is a view for explaining the concept of general deinterlacing of video data according to the related art.
Figure 2:
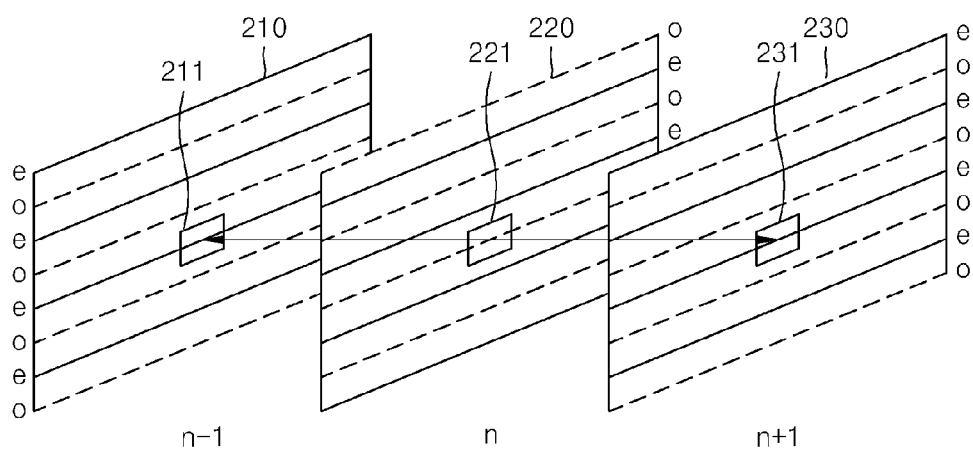
FIG. 2 is a view for explaining temporal interpolation with respect to a current video field according to a related art deinterlacing method.
Figure 3:
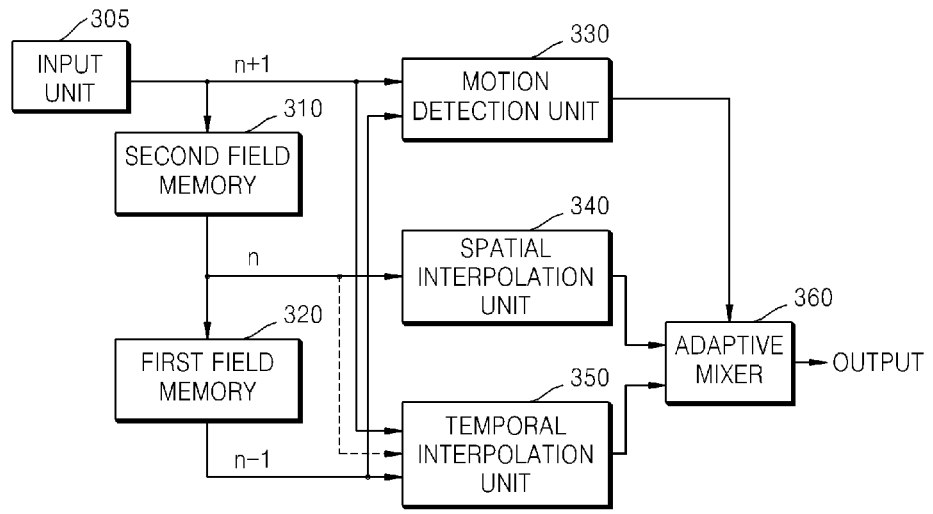
FIG. 3 is a functional block diagram of an apparatus for motion adaptive deinterlacing in a related art deinterlacing apparatus.
Figure 4:
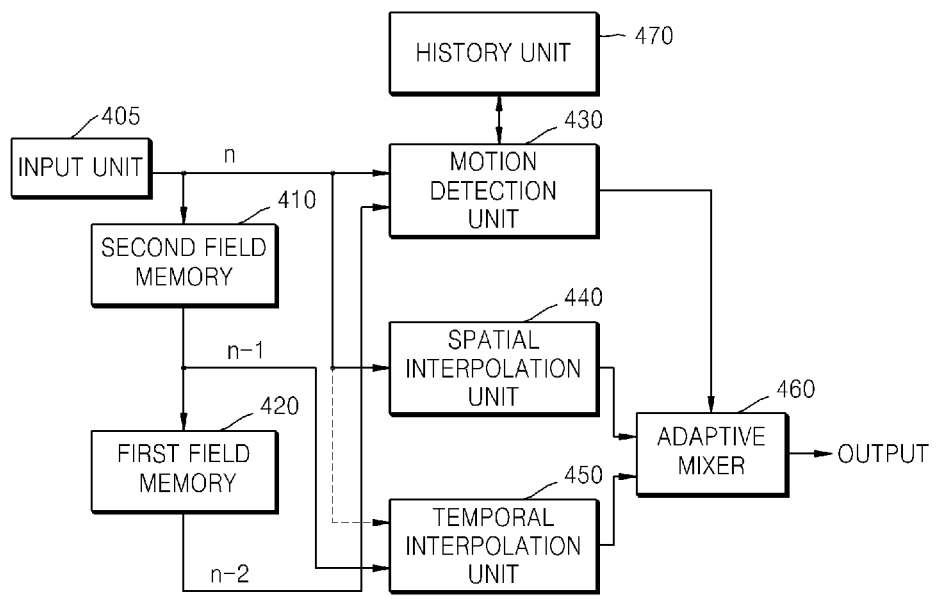
FIG. 4 is a functional block diagram of an apparatus for motion adaptive deinterlacing according to an exemplary embodiment of the present invention.

FIG. 4 is a functional block diagram of an apparatus for motion adaptive deinterlacing according to an exemplary embodiment of the present invention.

A deinterlacing process includes an interpolation process for converting each field of an interlaced video signal into a frame. Interpolation can be classified into temporal interpolation using an average of two pixels that are temporally adjacent to each other and spatial interpolation using an average of two pixels that are spatially adjacent to each other. Deinterlacing using spatial interpolation is referred to as two-dimensional deinterlacing, and deinterlacing that uses temporal interpolation and spatial interpolation adaptively according to circumstances based on a motion of video data in a video signal is referred to as three-dimensional deinterlacing.

Referring to FIG. 4, an input unit 405 receives a plurality of fields in an interlaced format to be deinterlaced.

A first field memory 420 is a memory for a field delay of a field preceding a previous $(n-1)^{th}$ video field, i.e. an $(n-2)^{th}$ video field. The first field memory 420, i.e., an $(n-2)^{th}$ video field, stores and manages the $(n-2)^{th}$ video field for detection of motion of a pixel. The field stored in the first field memory 420 has a same field identifier (ID) as a field ID of an $n^{th}$ video field that is to be currently interpolated. In other words, both of the (n−2)th and nth video fields are the same even fields or odd fields.

A second field memory 410 is a memory for a field delay of a previous field, i.e. an $(n-1)^{th}$ video field. The field stored in the second field memory 410, i.e., an $(n-1)^{th}$ video field, has data that is referred to for temporal interpolation with respect to the current $n^{th}$ video field, and has a different field ID from that of the current $n^{th}$ video field. In other words, if an $(n-1)^{th}$ video field is an even field then, an $n^{th}$ video field is an odd field.

A motion detection unit 430 determines whether or not a pixel has motion for interpolation with respect to the current $n^{th}$ video field. The motion detection unit 430 compares a difference between corresponding pixels of a plurality of fields all having a same field ID (even or odd field), with a threshold value. The threshold value may be predetermined. The threshold value may be determined experimentally according to characteristics of the video signal. In particular, the motion detection unit 430 uses the current $n^{th}$ video field and the $(n-2)^{th}$ video field stored in the first field memory 420 as input values. In other words, for interpolation with respect to the current $n^{th}$ field, the difference between pixels of the current $n^{th}$ video field and the $(n-2)^{th}$ video field is compared with the threshold value without waiting for the input of the next field following the current $n^{th}$ video field. If the difference is less than the threshold value, the current $n^{th}$ video field is regarded as being in a still state, and thus temporal interpolation is performed on the current $n^{th}$ video field. If the difference is greater than the threshold value, it is determined that the current $n^{th}$ video field includes motion, and thus temporal interpolation is not performed but rather spatial interpolation is performed on the current $n^{th}$ video field. The $n^{th}$ video field and the $(n-2)^{th}$ video field have the same field ID as top (odd) or bottom (even) fields for example. Thus, motion of a pixel can be detected without waiting for the input of the $(n+1)^{th}$ video field following the $n^{th}$ video field.

A history unit 470 stores motion detection results that have been obtained for previous fields as well as a motion detection result for the current $n^{th}$ video field, and manages the motion detection results as a history for use in motion detection with respect to the current $n^{th}$ video field. In other words, although the motion detection unit 430 determines whether or not the current $n^{th}$ field has motion using the relationship with the $(n-2)^{th}$ video field without using the next field following the current $n^{th}$ video field, the reliability of motion detection may be improved because the history unit 470 stores and manages the motion detection results for previous fields for use in motion detection of the current $n^{th}$ video field.

A spatial interpolation unit 440 performs intra field spatial interpolation with respect to the current $n^{th}$ video field. Spatial interpolation involves obtaining data of an empty intermediate line between two lines of an input interlaced current field by calculating an intermediate value between pixel data of the two lines. As an example of such a calculation, a weight could be applied to pixel data of the two lines to calculate an intermediate value. The data thus obtained for the intermediate line is output to a subsequent stage after the line above the two lines is output, and then the line below the two lines is output. In this way, an interlaced video signal can be displayed in a video reproduction apparatus in the progressive format, such as a monitor, by including data of intermediate lines between every two lines.

A temporal interpolation unit 450 interpolates data of an empty line of the current $n^{th}$ video field from another field that is temporally adjacent to the current $n^{th}$ video field. In a related art method, in order to calculate empty pixel data of the current field based on data of the previous interlaced field, the current field, and the next field, an intermediate value between a pixel data of the previous field and a pixel data of the next field is calculated. Again, this intermediate value could be calculated using a weight applied to the pixel data of the previous field and the pixel data of the next field. However, in the present invention, since deinterlacing is performed without the input of the next field, only the previous field is referred to for temporal interpolation with respect to the current field. The previous field is the $(n-1)^{th}$ video field and has a different field ID from the current $n^{th}$ video field. In other words, when the current $n^{th}$ video field is a top field, the $(n-1)^{th}$ video field is a bottom field. Since the current field converted into a progressive format is completed every time an even or odd field is completely input, the current field can be output in frame units. The temporal interpolation unit 450 also selectively receives information on the current $n^{th}$ video field (as illustrated by the dotted line which inputs into the temporal interpolation unit 450), i.e., values of line data in the currently input video field, and calculates a correlation between a line to be temporally interpolated in the current $n^{th}$ video field which is interpolated from the corresponding value in the previous $(n-1)^{th}$ video field and lines above and below the line to be temporally interpolated, to determine whether or not temporal interpolation has an error, thereby improving the reliability of the temporal interpolation.

An adaptive mixer 460 selectively mixes a spatial interpolation result of the spatial interpolation unit 440 and a temporal interpolation result of the temporal interpolation unit 450 according to a motion detection result of the motion detection unit 430 during interpolation with respect to the current $n^{th}$ video field, thereby outputting a final result. The final result may also be stored in a storage medium (not shown).

Figure 5:
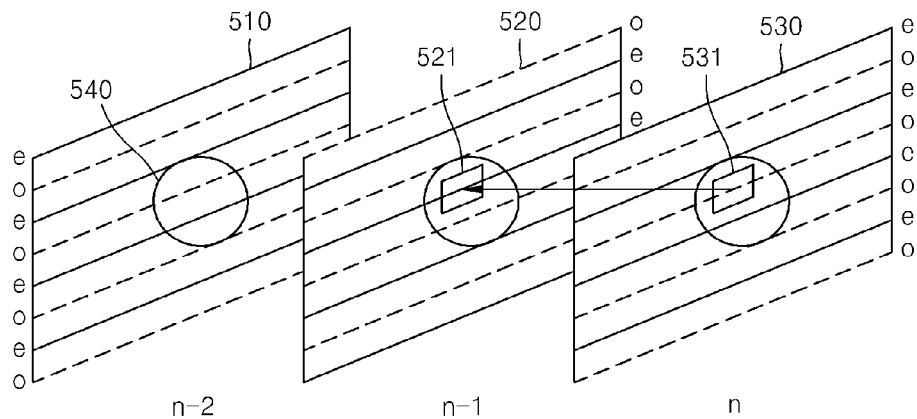
FIG. 5 is a view for explaining temporal interpolation with respect to a current video field according to an exemplary embodiment of the present invention.

FIG. 5 is a view for explaining temporal interpolation with respect to a current video field according to an exemplary embodiment of the present invention.

Referring to FIG. 5, when detecting motion of a pixel as well as motion of an object 540, a current $n^{th}$ video field 530 is compared with an $(n-2)^{th}$ video field 510 to detect motion. As shown in FIG. 5, in the case of a still image in which the object 540 has no motion and the background is also in a still state, temporal interpolation is performed on the current $n^{th}$ video field 530 with reference to only the video field preceding the current $n^{th}$ video field 530, i.e. the $(n-1)^{th}$ video field 520. Pixel data 531 of a line to be interpolated in the current $n^{th}$ video field 530 is interpolated by referring to only pixel data 521 of the $(n-1)^{th}$ video field 520.

Figure 6:
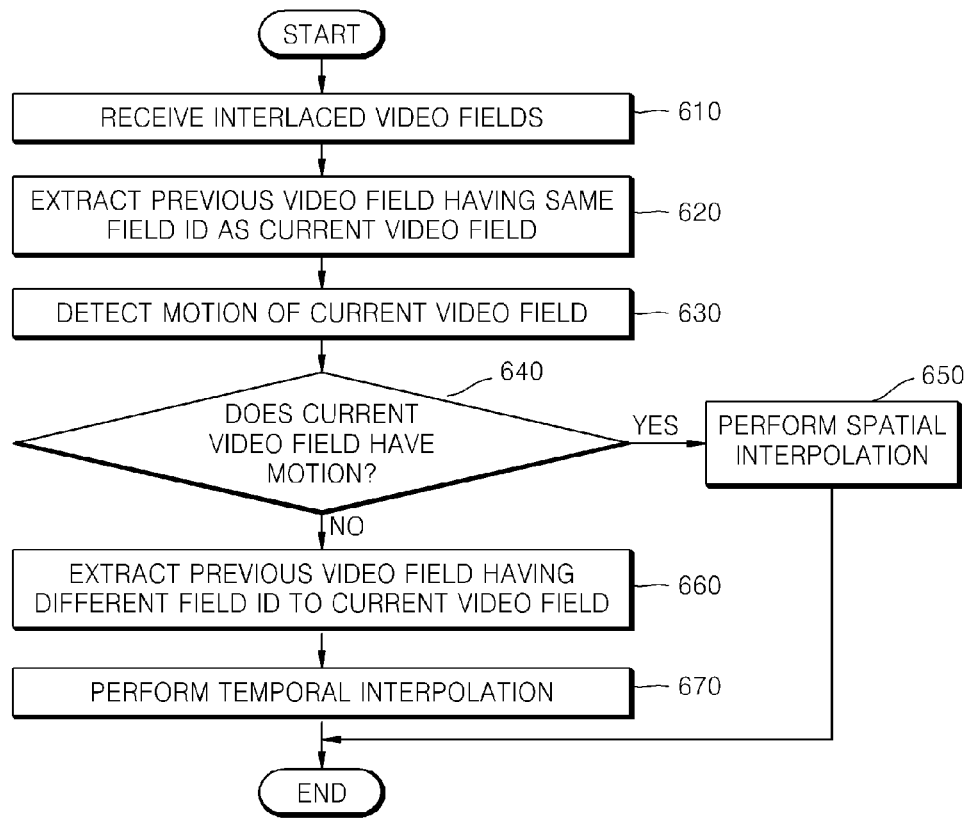
FIG. 6 is a flowchart illustrating a method of motion adaptive deinterlacing according to another exemplary embodiment of the present invention.

FIG. 6 is a flowchart illustrating a method of motion adaptive deinterlacing according to another exemplary embodiment of the present invention.

Referring to FIG. 6, one or more interlaced video fields are input in operation 610, and motion detection is performed for interpolation with respect to the current video field based on motion. The previous video field having a same field ID as the current video field is extracted in operation 620, and the extracted previous video field is compared with the current video field to detect motion in operation 630. In other words, when the current $n^{th}$ video field is a top field, a previous top field, i.e. the $(n-2)^{th}$ video field is extracted to determine whether or not the current $n^{th}$ video field is a still image or has motion, based on the difference between pixel data of a line of the current $n^{th}$ video field and pixel data of a corresponding line of the $(n-2)^{th}$ video field. If it is determined that the current video field has motion, spatial interpolation is applied to the current $n^{th}$ video field which is regarded as having motion in operation 650. If it is determined that the current video field does not have motion, temporal interpolation is applied to the current $n^{th}$ video field which is regarded as a still image. For temporal interpolation, the previous video field having a different field ID from the current $n^{th}$ video field is extracted in operation 660, and temporal interpolation is performed by referring to only the extracted previous field in operation 670. In other words, when the current $n^{th}$ video field is a top field, the previous bottom field, i.e. the $(n-1)^{th}$ video field is extracted and pixel data of an empty line of the current $n^{th}$ video field is interpolated by referring to the $(n-1)^{th}$ video field. A result of the interpolation may be stored in a storage medium.

The method of motion adaptive deinterlacing according to an exemplary embodiment of the present invention can also be embodied as a computer-readable code on a computer-readable recording medium. The computer-readable recording medium may be any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over a network of coupled computer systems so that the computer-readable code is stored and executed in a decentralized fashion.

As described above, according to an exemplary embodiment of the present invention, during deinterlacing, it is not necessary to wait for the input of the next video field, thereby reducing a delay of the output. In particular, when a game device is connected to a display device such as a TV, the quality of manipulation with non-delay processing of the game device can be improved. Additionally, line flicker which is generated as a result of skipping the processing of the deinterlacing to avoid a delay is not produced.

While the present inventive concept has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A deinterlacing method for converting an interlaced format into a progressive format, the deinterlacing method comprising:

receiving a plurality of previous interlaced video fields;

extracting a first previous video field having a field identifier (ID) which is the same as a field ID of a currently input video field from the plurality of previous interlaced video fields;

detecting motion by comparing the first previous video field which is extracted with the currently input video field; and interpolating the currently input video field according to a result of the detecting the motion, wherein the deinterlacing is performed without the input of a next field, and only a previous field is referred to for temporal interpolation with respect to the current field, wherein the first previous video field is a video field preceding the previous video field of the currently input video field which is not temporarily adjacent to the currently input video field, and wherein the detecting comprises detecting motion by using motion detection results that have been obtained for previous video fields preceding the first previous video field and a motion detection result for the currently input video field.

2. The deinterlacing method of claim 1, wherein the detecting the motion comprises comparing a difference between the extracted first previous video field and the currently input video field with a threshold value.

3. The deinterlacing method of claim 1, further comprising storing a result of interpolating the currently input video field in a storage medium.

4. A deinterlacing method for converting an interlaced format into a progressive format, the deinterlacing method comprising:

receiving a plurality of previous interlaced video fields;

extracting a second previous video field having a field identifier (ID) which is different from a field ID of a currently input video field from the plurality of interlaced video fields; and performing temporal interpolation with respect to the currently input video field using only the extracted second previous video field, wherein the deinterlacing is performed without the input of a next field, and only the second previous field is referred to for temporal interpolation with respect to the current field, wherein the second previous video field is a video field prior to the currently input video field which is temporarily adjacent to the currently input video field, and wherein the performing the temporal interpolation comprises detecting an error in the temporal interpolation by comparing information of the currently input video field with information of the second previous video field used for the temporal interpolation.

5. A deinterlacing method for converting an interlaced format into a progressive format, the deinterlacing method comprising:
- receiving a plurality of previous interlaced video fields;
- extracting a first previous video field having a first field identifier (ID) which is the same as a field ID of a currently input video field from the plurality of previous interlaced video fields;
- detecting motion by comparing the extracted first previous video field with the currently input video field;
- extracting a second previous video field having a second field ID which is different from the field ID of the currently input video field from the plurality of previous interlaced video fields; and
- performing, based on a result of the detecting motion, temporal interpolation with respect to the currently input video field using only the extracted second previous video field, wherein the deinterlacing is performed without the input of a next field, and only the second previous field is referred to for temporal interpolation with respect to the current field,
- wherein the first previous video field is a video field preceding the second previous video which is not temporarily adjacent to the currently input video field and the second previous video field is a video field prior to the currently input video field which is temporarily adjacent to the currently input video field, and
- wherein the detecting comprises detecting motion by using motion detection results that have been obtained for previous video fields preceding the first previous video field and a motion detection result for the currently input video field.

6. The deinterlacing method of claim 5, wherein the detecting the motion comprises comparing a difference between the extracted first previous video field and the currently input video field with a threshold value.

7. The deinterlacing method of claim 5, wherein the performing the temporal interpolation comprises detecting an error in the temporal interpolation by comparing information of the currently input video field with information of the second previous video field used for the temporal interpolation.

8. The deinterlacing method of claim 5, wherein the detecting the motion comprises storing a result of detecting the motion as a history.

9. The deinterlacing method of claim 5, further comprising storing a result of the temporal interpolation in a storage medium.

10. A deinterlacing apparatus for converting an interlaced format into a progressive format, the deinterlacing apparatus comprising:
- an input unit which inputs a plurality of previous interlaced video fields;
- a first field memory which stores a first previous video field having a first field identifier (ID) which is the same as a field ID of a currently input video field among the plurality of previous interlaced video fields;
- a second field memory which stores a second previous video field having a second field ID which is different from the field ID of the currently input video field among the plurality of previous interlaced video fields;
- a motion detection unit which detects motion by comparing the first previous video field with the currently input video field; and
- a temporal interpolation unit which performs, based on a result of detecting motion by the motion detection unit, temporal interpolation with respect to the currently input video field using only the second previous video field, wherein the deinterlacing is performed without the input of a next field, and only the second previous field is referred to for temporal interpolation with respect to the current field,
- wherein the first previous video field is a video field preceding the second previous video which is not temporarily adjacent to the currently input video field and the second previous video field is a video field prior to the currently input video field which is temporarily adjacent to the currently input video field, and
- wherein the motion detection unit detects motion by using motion detection results that have been obtained for previous video fields preceding the first previous video field and a motion detection result for the currently input video field.

11. The deinterlacing apparatus of claim 10, wherein the temporal interpolation unit detects an error in the temporal interpolation by comparing information of the currently input video field with information of the second previous video field.

12. The deinterlacing apparatus of claim 10, further comprising a history unit which stores and manages a result of the motion detection with respect to at least one previous video field.

13. The deinterlacing apparatus of claim 10, further comprising:
- a spatial interpolation unit which performs spatial interpolation with respect to the currently input video field; and
- an adaptive mixer which selectively mixes an output of the spatial interpolation unit and an output of the temporal interpolation unit according to an output of the motion detection unit.

14. The deinterlacing apparatus of claim 13, wherein the adaptive mixer selectively operates during the interpolation with respect to the currently input video field.

15. A non-transitory computer-readable recording medium having recorded thereon a program for implementing a deinterlacing method comprising:
- receiving a plurality of previous interlaced video fields;
- extracting a first previous video field having a first field identifier (ID) which is the same as a field ID of a currently input video field from the plurality of previous interlaced video fields;
- detecting motion by comparing the extracted first previous video field with the currently input video field;
- extracting a second previous video field having a second field ID which is different from the field ID of the currently input video field from the plurality of previous interlaced video fields; and
- performing, based on a result of the detecting motion, temporal interpolation with respect to the currently input video field using only the extracted second previous video field, wherein the deinterlacing is performed without the input of a next field, and only the second previous field is referred to for temporal interpolation with respect to the current field,
- wherein the first previous video field is a video field preceding the second previous video which is not temporarily adjacent to the currently input video field and the second previous video field is a video field prior to the currently input video field which is temporarily adjacent to the currently input video field, and
- wherein the detecting comprises detecting motion by using motion detection results that have been obtained for previous video fields preceding the first previous video field and a motion detection result for the currently input video field.

16. A video reproduction apparatus comprising a deinterlacing apparatus comprising:

an input unit which inputs a plurality of previous interlaced video fields;

a first field memory which stores a first previous video field having a first field identifier (ID) which is the same as a field ID of a currently input video field among the plurality of previous interlaced video fields;

a second field memory which stores a second previous video field having a second field ID which is different from the field ID of the currently input video field among the plurality of previous interlaced video fields;

a motion detection unit which detects motion by comparing the first previous video field with the currently input video field; and a temporal interpolation unit which performs, based on a result of detecting motion by the motion detection unit that motion is not detected, temporal interpolation with respect to the currently input video field using only the second previous video field, wherein the deinterlacing is performed without the input of a next field, and only the second previous field is referred to for temporal interpolation with respect to the current field, wherein the first previous video field is a video field preceding the second previous video which is not temporarily adjacent to the currently input video field and the second previous video field is a video field prior to the currently input video field which is temporarily adjacent to the currently input video field, and wherein the motion detection unit detects motion by using motion detection results that have been obtained for previous video fields preceding the first previous video field and a motion detection result for the currently input video field.

17. The deinterlacing method of claim 5, further comprising:

performing, based on the result of the detecting motion that motion is detected, spatial interpolation with respect to the currently input video field.

\* \* \* \* \*